United States Patent
Dumchin (10) Patent No.: US 9,014,370 B2
(45) Date of Patent: Apr. 21, 2015

(54) HIGH PERFORMANCE HARDWARE-BASED EXECUTION UNIT FOR PERFORMING C2 BLOCK CIPHER ENCRYPTION/DECRYPTION

(71) Applicant: Yan Dumchin, Beer Sheva (IL)

(72) Inventor: Yan Dumchin, Beer Sheva (IL)

(73) Assignee: SanDisk Technologies Inc., Plano, TX (US)

( * ) Notice: Subject to any disclaimer, the term of this patent is extended or adjusted under 35 U.S.C. 154(b) by 81 days.

(21) Appl. No.: 13/971,399

(22) Filed: Aug. 20, 2013

(65) Prior Publication Data

US 2014/0161253 A1 Jun. 12, 2014

(30) Foreign Application Priority Data

Dec. 9, 2012 (IL) .......................................... 223520

(51) Int. Cl.
*H04L 9/00* (2006.01)
*G09C 1/00* (2006.01)
*H04L 9/06* (2006.01)
*H04L 9/28* (2006.01)

(52) U.S. Cl.
CPC ................ *G09C 1/00* (2013.01); *H04L 9/0631* (2013.01); *H04L 9/0625* (2013.01); *H04L 2209/24* (2013.01)

(58) Field of Classification Search
CPC ..... H04L 9/0625; H04L 2209/24; G09C 1/00
See application file for complete search history.

(56) References Cited

U.S. PATENT DOCUMENTS

| 7,885,405 | B1 * | 2/2011 | Bong ............................... 380/37 |
| 7,890,750 | B2 * | 2/2011 | Dempski et al. ............... 713/153 |
| 8,005,209 | B2 * | 8/2011 | Joshi et al. ....................... 380/28 |
| 2005/0135607 | A1 * | 6/2005 | Lee et al. ......................... 380/28 |
| 2011/0116627 | A1 * | 5/2011 | Deng ............................... 380/44 |
| 2012/0033803 | A1 * | 2/2012 | Huang ............................. 380/28 |
| 2013/0318607 | A1 * | 11/2013 | Reed et al. ...................... 726/23 |

OTHER PUBLICATIONS

"Block Ciper Modes of Operation", Jul. 16, 2012, pp. 1-13, Wikipedia, available at http://en.wikipedia.org/wiki/Ciper_block_chaining.
"C2 Block Cipher Specification", Revision 1.0, Jan. 17, 2003, pp. 1-9, International Business Machines Corporation, Intel Corporation, Matsushita Electric Industrial Co., Ltd., and Toshiba Corporation, Israel.
"Cryptomeria Cipher", Oct. 11, 2012, pp. 1-3, Wikipedia, available at http://en.wikipedia.org/wiki/Cryptomeria_cipher.

* cited by examiner

*Primary Examiner* — Dede Zecher
*Assistant Examiner* — Trang Doan
(74) *Attorney, Agent, or Firm* — Brinks Gilson & Lione (57) ABSTRACT

A system and method for encrypting and/or decrypting data with a Cryptomeria (C2) cipher may be provided that generates C2 round keys in parallel. Accordingly, data may be encrypted or decrypted at least twice as fast as without the system. A storage device may encrypt data written to the storage device and/or decrypt data read from the storage device with such a system.

15 Claims, 7 Drawing Sheets

FIG. 5    ECB Mode Decryption

HIGH PERFORMANCE HARDWARE-BASED EXECUTION UNIT FOR PERFORMING C2 BLOCK CIPHER ENCRYPTION/DECRYPTION

This application claims priority under 35 U.S.C. §119 to Israel Patent Application No. 223520, filed Dec. 9, 2012, entitled "HIGH PERFORMANCE HARDWARE-BASED EXECUTION UNIT FOR PERFORMING C2 BLOCK CIPHER ENCYRPTION/DECRYPTION," the entire contents of which are hereby incorporated herein by reference.

BACKGROUND

1. Technical Field

This application relates to encryption/decryption and, in particular, to hardware-based encryption/decryption.

2. Related Art

The Cryptomeria Cipher (C2) is a Feistel network-based block cipher designed for use in the area of digital entertainment content protection. The C2 cipher is defined and licensed by the 4C (four company) Entity. The 4C Entity is a consortium formed by IBM, Intel, Matsushita and Toshiba.

The C2 cipher may have an input block size of 64 bits, an output block size of 64 bits, and an input key size of 56 bits. The C2 cipher may be a 10 round cipher. Details of the C2 cipher are provided in the C2 Block Cipher Specification published by the 4C Entity.

SUMMARY

A system for encrypting and/or decrypting data with a Cryptomeria (C2) cipher may be provided that includes a right cipher generator, a left cipher generator, an even round key generator, and an odd round key generator. The right cipher generator may generate a right half of a cipher text from a first round key based on the C2 cipher. The left cipher generator may generate a left half of the cipher text from a second round key based on the C2 cipher. The even round key generator may generate the first round key on even rounds. The odd round key generator may generate the second round key on odd rounds. The even round key generator and the odd round key generator may generate the first and second round keys together in a single clock cycle. The odd round key generator may include an initial key rotation circuit and an alternate key rotation circuit, where the odd round key generator generates the second round key from a rotated key. The initial key rotation circuit may generate the rotated key on a predetermined round, and the alternate key rotation circuit may generate the rotated key on rounds other than the predetermined round.

A storage device may be provided that encrypts data based on a Cryptomeria (C2) cipher and that includes a storage interface controller, a cryptographic engine, a storage memory, and a memory controller. The storage interface controller may process read and write requests directed to the storage device. The cryptographic engine may generate encrypted data based on the C2 cipher from data received at the storage interface controller. The memory controller may write the encrypted data to the storage memory. The cryptographic engine may comprise an even round key generator that generates a first round key on even rounds and an odd round key generator that generates a second round key on odd rounds. The odd round key generator may comprise an initial key rotation circuit and an alternate key rotation circuit. The odd round key generator may generate the second round key from a rotated key. The rotated key may be generated by the initial key rotation circuit on a predetermined round and by the alternate key rotation circuit on rounds other than the predetermined round. The cryptographic engine may generate the encrypted data from the first round key and the second round key. The even round key generator and the odd round key generator may operate in parallel.

A method of decrypting data on a storage device based on a Cryptomeria (C2) cipher may be provided. A read request may be received at a storage interface controller included in the storage device. Encrypted data may be read from a storage memory included in the storage device in response to the read request. The encrypted data may be decrypted with a decryption execution unit in the storage device based on the C2 cipher by generating a first round key and a second round key in parallel, wherein generating the first and second round keys in parallel may comprises generating the first round key with a standard initial key reverse rotation circuit if a round count is a predetermined round or with a standard key reverse rotation circuit if the round count is not the predetermined round, and generating the second round key with an alternate initial key reverse rotation circuit if the round count is the predetermined round or with an alternate key reverse rotation circuit if the round count is not the predetermined round. The decryption execution unit may generate decrypted data from the first and second round keys and from the encrypted data. The read request may be responded to by transmitting the decrypted data from the storage interface controller.

Further objects and advantages of the present disclosure will be apparent from the following description, reference being made to the accompanying drawings.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A circuit to encrypt and/or decrypt data based on the C2 cipher may take ten clock cycles to complete because a clock cycle is needed for each of the ten rounds described in the C2 Block Cipher Specification. A round key may be generated for each round, and a rotated key from a previous round is required to generate the round key except for the very first round key generated. Accordingly, a clock cycle is needed for each of the ten rounds. However, a system is provided herein to encrypt and/or decrypt data based on the C2 cipher that may take only five clock cycles to complete for each data block because the system may generate two round keys in a single clock cycle.

For example, a system for encrypting data with the C2 cipher may be provided that includes a right cipher generator, a left cipher generator, an even round key generator, and an odd round key generator that operate in parallel. The even round key generator may generate a first round key on even rounds. The odd round key generator may generate a second round key on odd rounds. The even round key generator and the odd round key generator may generate the first and second round keys together in a single clock cycle. The right cipher generator may generate a right half of a cipher text from the first round key based on the C2 cipher. The left cipher generator may generate a left half of the cipher text from the second round key based on the C2 cipher.

The odd round key generator may include an initial key rotation circuit and an alternate key rotation circuit, where the odd round key generator generates the second round key from the rotated key. The initial key rotation circuit may generate the rotated key on the first round (round zero), and the alternate key rotation circuit may generate the rotated key on rounds other than the first round (rounds one through nine).

Figure 1:
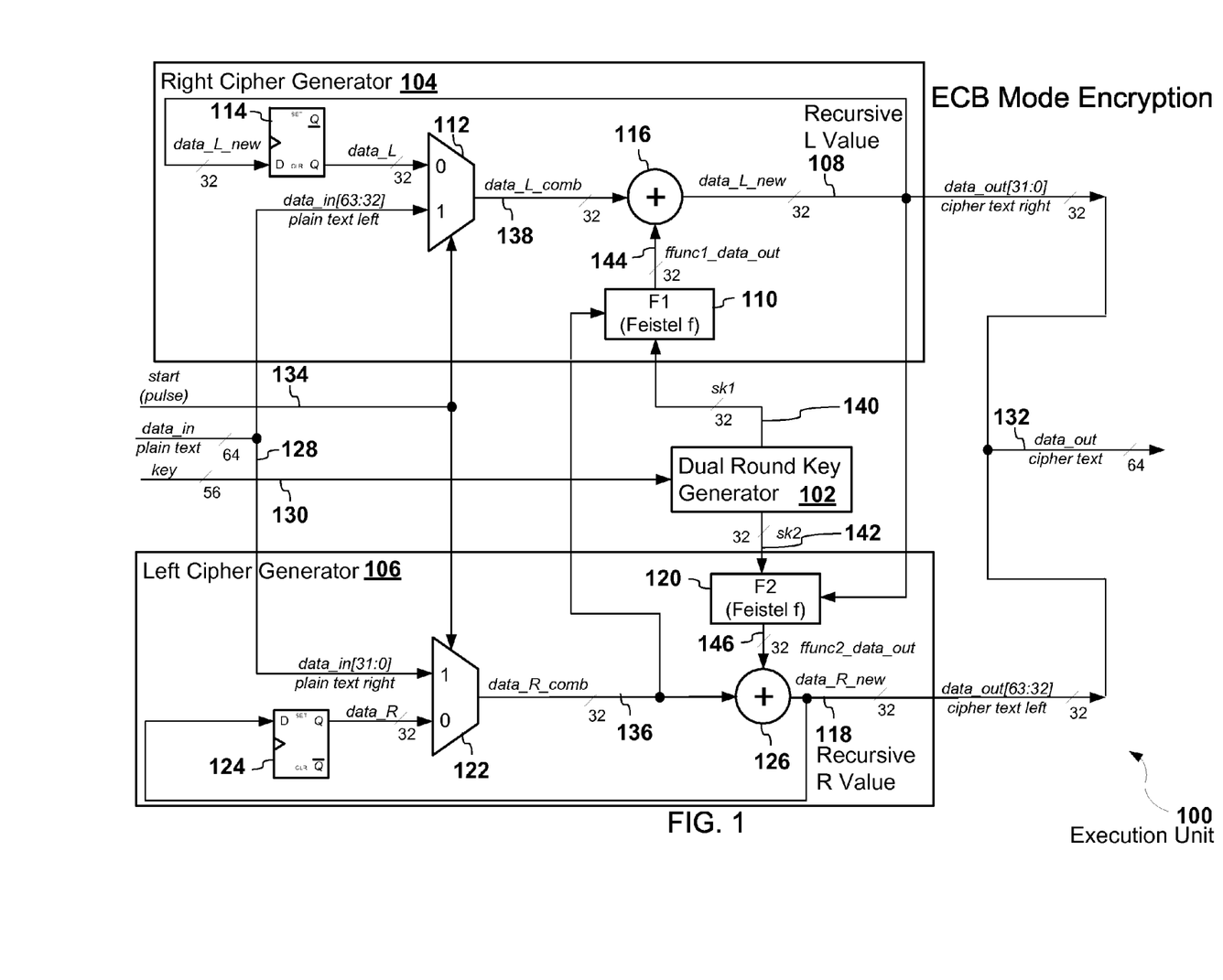
FIG. 1 illustrates an execution unit 100 for encrypting data with a Cryptomeria (C2) cipher in Electronic Codebook (ECB) Mode.

FIG. 1 illustrates an execution unit 100 for encrypting data 128 with a Cryptomeria (C2) cipher in Electronic Codebook (ECB) Mode. The execution unit 100 may include a dual round key generator 102, a right cipher generator 104, and a left cipher generator 106.

The right cipher generator 104 may be any hardware or a combination of hardware and software that generates a recursive left value 108 on even rounds, which may be rounds zero, two, four, six, and eight. The recursive left value 108 may correspond to L in the C2 Block Cipher Specification.

The left cipher generator 106 may be hardware or a combination of hardware and software that generates a recursive right value 118 on odd rounds, which may be rounds one, three, five, seven, and nine. The recursive right value 118 may correspond to R in the C2 Block Cipher Specification.

The recursive left value 108 and the recursive right value 118 for rounds eight and nine, respectively, together form a resultant cipher text 132. In particular, the least significant bits of the cipher text 132 (cipher text right) may comprise the recursive left value 108 from round eight generated by the right cipher generator 104. Correspondingly, the most significant bits of the cipher text 132 (cipher text left) may comprise the recursive right value 118 from round nine generated by the left cipher generator 106. The cipher text 132 is the input data 128 in encrypted form.

The dual round key generator 102 may be any circuit that generates two keys in parallel: a first subkey 140 (sk1) and a second subkey 142 (sk2). The first subkey 140 and the second subkey 142 may also be referred to as a first round key 140 and a second round key 142, respectively, because each of the subkeys 140 and 142 is a key generated in a respective one of the ten rounds of the C2 cipher. The first round key 140 may be the key generated in the even rounds. The second round key 142 may be the key generated in the odd rounds. The dual round key generator 102 is described in detail below in reference to FIG. 2.

During operation of the execution unit 100, the execution unit 100 may receive the input data 128 to be encrypted and an input key 130. The input data 128 may be 64 bits and be plain text. The input key 130 may be a 56 bit encryption key.

The right cipher generator 104 and the left cipher generator 106 may operate in parallel. In other words, the right cipher generator 104 and the left cipher generator 106 may generate the recursive left value 108 and the recursive right value 118, respectively, in parallel. For example, for each clock cycle, the right cipher generator 104 may generate the recursive left value 108 for an even round, while the left cipher generator 106 generates the recursive right value 118 for an odd round. As a result, the execution unit 100 may generate the cipher text 132 from the input data 128 in five clock cycles instead of in ten clock cycles.

In addition to the input key 130 and the input data 128, the right cipher generator 104 and the left cipher generator 106 may receive a start pulse 134. The start pulse 134 may go high during the first of the five clock cycles, and go low during the remaining four clock cycles. Alternatively, the start pulse 134 may go low during the first of the five clock cycles, and go high during the remaining four clock cycles.

The right cipher generator 104 and the left cipher generator 106 may receive additional inputs. For example, the left cipher generator 106 may receive the recursive left value 108 from the right cipher generator 104. On the other hand, the right cipher generator 104 may receive a right data combination 136 (data_R_comb) from the left cipher generator 106. The right cipher generator 104 may receive the first round key 140 from the dual round key generator 102. The left cipher generator 106 may receive the second round key 142 from the dual round key generator 102.

The right cipher generator 104 may include, for example, a first Feistel module 110, a multiplexer 112, a flip-flop 114, and an adder 116. The left cipher generator 106 may include, for example, a second Feistel module 120, a multiplexer 122, a flip-flop 124, and an adder 126.

Each of the first and second Feistel modules 110 and 120 may implement the Cryptomeria Feistel round function, which is described in the C2 Block Cipher Specification. For example, Table 1 below lists an implementation of the Cryptomeria Feistel round function that is written in the C programming language. The implementation listed in Table 1 was provided in the Jan. 17, 2003 revision of the C2 Block Cipher Specification. The first and second Feistel modules 110 and 120 may be implemented in hardware or a combination of hardware and software. The first Feistel module 110 may generate a first Feistel round output 144 from the first round key 140 and the right data combination 136. The second Feistel module 120 may generate a second Feistel round output 146 from the second round key 142 and the recursive left value 108. The "data" and the "key" arguments in the "F" programming procedure listed in Table 1 may correspond to the right data combination 136 and the first round key 140, respectively, or to the recursive left value 108 and the second round key 142, respectively.

TABLE 1

Cryptomeria Feistel Round Function

/*
This source assumes a Big Endian machine (most significant byte first), where the "long" is 32 bits:

TABLE 1-continued

Cryptomeria Feistel Round Function

```
*/
typedef unsigned long WORD32;
typedef unsigned char BYTE;
/*
Logical left rotate macros:
*/
#define lrot8(x,n) (((x)<<(n))|((x)>>(8-(n))))
#define lrot32(x,n) (((WORD32)(x)<<(n))|((WORD32)(x)>>(32-(n))))
/*
The secret constant is available under license from the 4C Entity, LLC.
*/
extern const BYTE SecretConstant[256];
/*
The cipher has 10 rounds:
*/
#define MaxRound 10
/*
F is the Feistel round function:
*/
static WORD32 F(WORD32 data, WORD32 key)
{
WORD32 t;
BYTE v[4], u;
/* Key Insersion */
t = data+key;
/* Secret Constant */
v[3] = (BYTE)((t>>24)&0xff);
v[2] = (BYTE)((t>>16)&0xff);
v[1] = (BYTE)((t>> 8)&0xff);
v[0] = SecretConstant[t&0xff];
u = v[0]^0x65; v[1] ^= lrot8(u,1);
u = v[0]^0x2b; v[2] ^= lrot8(u,5);
u = v[0]^0xc9; v[3] ^= lrot8(u,2);
/* Rotate */
t = ((WORD32)v[3]<<24)|((WORD32)v[2]<<16)|((WORD32)v[1]<<8)|(WORD32)v[0];
t ^= lrot32(t,9) ^ lrot32(t,22);
return t;
}
```

Each of the flip-flops 114 and 124 may be any component that outputs a stored value from a previous clock cycle. For example, the flip-flops 114 and 124 may be D-type flip-flops, latches, or any other component that outputs a stored value from a previous clock cycle. An input of the flip-flop 114 of the right cipher generator 104 may be the recursive left value 108. The output of the flip-flop 114 of the right cipher generator 104 may be the recursive left value 108 from a previous even round. For example, the output of the flip-flop 114 of the right cipher generator 104 on rounds two, four, six, and eight may be the recursive left value 108 from rounds zero, two, four, and six, respectively. Similarly, the output of the flip-flop 124 of the left cipher generator 106 may be the recursive right value 118 from a previous odd round. For example, the output of the flip-flop 124 of the left cipher generator 106 on rounds three, five, seven, and nine may be the recursive right value 118 from rounds one, three, five, and seven, respectively.

Each of the multiplexers 112 and 122 may be any component that selects one of multiple inputs and forwards the selected input as an output. The output of the multiplexer 112 of the right cipher generator 104 may be a data left combination 138 (data_L_new). A first one of the inputs of the multiplexer 112 of the right cipher generator 104 may be the recursive left value 108 from the previous even round stored in the flip-flop 114. A second one of the inputs of the multiplexer 112 of the right cipher generator 104 may be a left half (the 32 most significant bits) of the input data 128 (plain text left). Correspondingly, the output of the multiplexer 122 of the left cipher generator 106 may be the data right combination 136. A first one of the inputs of the multiplexer 122 of the left cipher generator 106 may be the recursive right value 118 from the previous odd round stored in the flip-flop 124. A second one of the inputs of the multiplexer 122 of the left cipher generator 106 may be a right half (the 32 least significant bits) of the input data 128 (plain text right).

A selector of the multiplexer 112 or 122 may receive the start pulse 134. In the first clock cycle, the multiplexer 112 of the right cipher generator 104 may select the left half of the input data 128 to be output as the data left combination 138. In the remaining four clock cycles, the multiplexer 112 may select the recursive left value 108 from the previous even round stored in the flip-flop 114. Similarly, in the first clock cycle, the multiplexer 122 of the left cipher generator 106 may select the right half of the input data 128 to be output as the data right combination 136. In the remaining four clock cycles, the multiplexer 122 may select the recursive right value 118 from the previous odd round stored in the flip-flop 124.

Each of the adders 116 and 126 may be any component that sums two inputs together and outputs the sum. For example, each of the adders 116 and 126 may add two 32-bit numbers and generate a 32 bit output that represents the sum of the two numbers without a carry bit. The adder 116 of the right cipher generator 104 may determine the recursive left value 108 as the sum of the data left combination 138 and the first Feistel round output 144. The adder 126 of the left cipher generator 106 may determine the recursive right value 118 as the sum of the data right combination 136 and the second Feistel round output 146.

Figure 2:
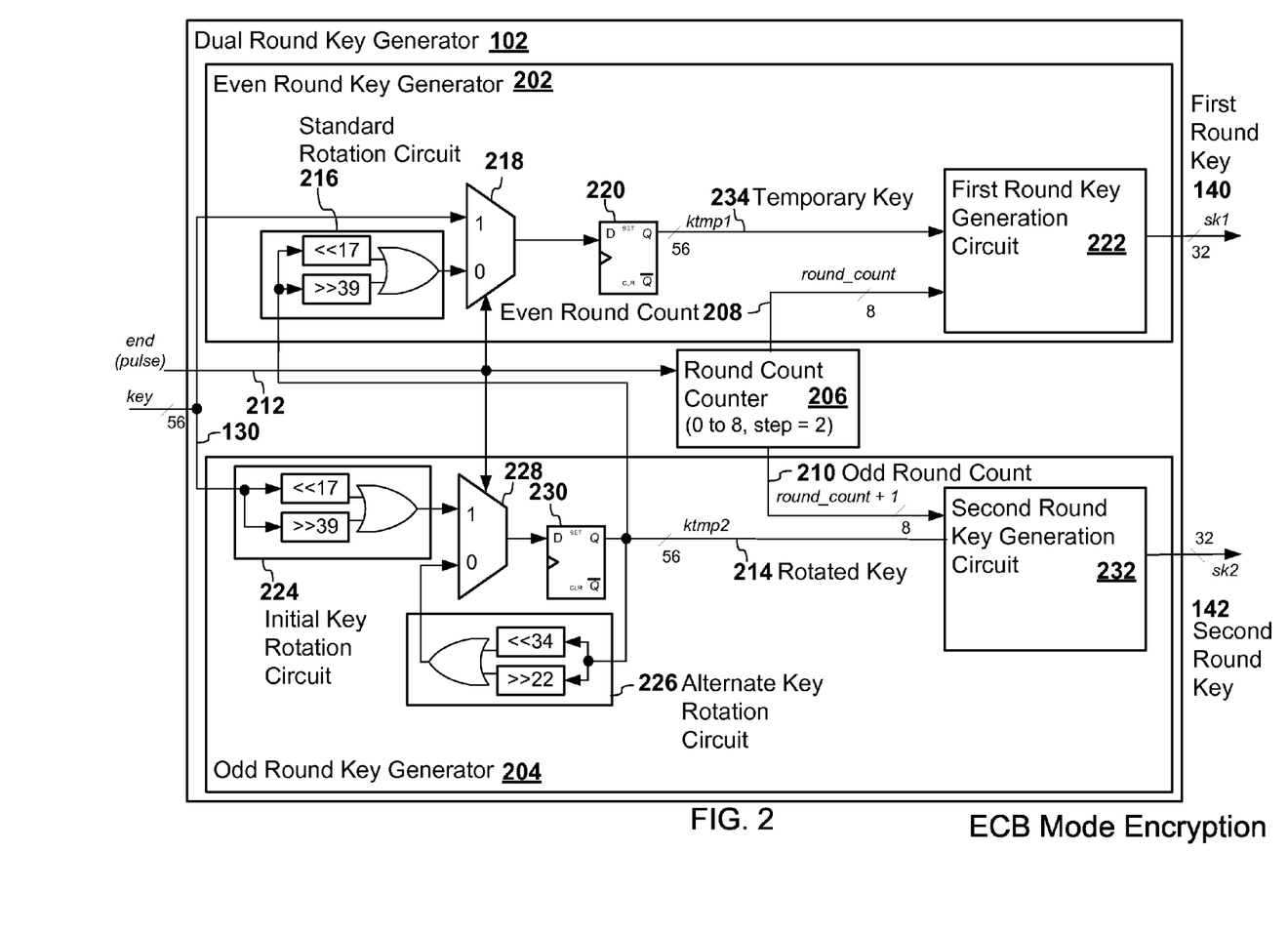
FIG. 2 illustrates the dual round key generator for the C2 cipher in ECB Mode Encryption.

FIG. 2 illustrates the dual round key generator 102 for the C2 cipher in ECB Mode Encryption. The dual round key generator 102 may include an even round key generator 202, an odd round key generator 204, and a round count counter 206.

The round count counter 206 may by any component that generates an even round count 208 and an odd round count 210, where the even round count 208 starts at zero and increments by two until the even round count 208 equals eight, and the odd round count 210 is one greater than the even round count 208. In other words, the even round count 208 is an even value that ranges from zero to eight, and the incremented round count 210 is an odd value that ranges from one to nine. Accordingly, the round count counter 206 may generate the even round counts as the even round count 208 and the odd round counts 210 as the incremented even round count 208. In one example, the round count counter 206 may include a counter and an adder, where the counter has a step of two, and where the even round count 208 is the output of the counter, and the odd round count 210 is the output of an adder that adds one to the even round count 208.

The even round key generator 202 may be any component that generates the first round key 140 for the right cipher generator 104. The odd round key generator 204 may be any component that generates the second round key 142 for the left cipher generator 106.

An end signal 212 may be a pulse signal that goes high during the fifth clock cycle, and is low during the first clock cycle to the fourth clock cycle. Alternatively, the end signal 212 may be a pulse signal that goes low during the fifth clock cycle, and is high during the first clock cycle to the fourth clock cycle. The change in the end signal 212 may reset the round count counter. Alternatively or in addition, the end signal 212 may change state during a reset cycle.

During operation of the dual round key generator 102, the even round key generator 202 may operate in parallel with the odd round key generator 204. In other words, the even round key generator 202 may generate the first round key 140 for an even round while the odd round key generator 204 generates the second round key 142 for an odd round. The even round key generator 202 may generate the first round key 140 for rounds zero, two, four, six, and eight. In parallel, the odd round key generator 204 may generate the second round key 142 for rounds one, three, five, seven, and nine.

The even round key generator 202 may receive the even round count 208 from the round count counter 206. The odd round key generator 204 may receive the odd round count 210 from the round count counter 206. The even round key generator 202 and the odd round key generator 204 may receive the input key 130 and the end signal 212. In addition, the even round key generator 202 may receive a rotated key 214 from the odd round key generator 204.

The even round key generator 202 may include a standard rotation circuit 216, a multiplexer 218, a flip-flop 220, and a first round key generation circuit 222. The odd round key generator 204 may include an initial key rotation circuit 224, an alternate key rotation circuit 226, a multiplexer 228, a flip-flop 230, and a second round key generation circuit 232. The standard rotation circuit 216 of the even round key generator 202 may be a circuit that rotates an input and outputs the result. Rotation relates to a circular shift (or bitwise rotation) operation, which may be an operation that shifts all bits of the input. Vacant bit positions may be filled in with the bits that are shifted out.

The input of the standard rotation circuit 216 may be the rotated key 214 generated by the odd round key generator 204. To rotate the rotated key 214, the standard rotation circuit 216 may shift the rotated key 214 to the left 17 bits, shift the rotated key 214 to the right 39 bits, and perform a bitwise Boolean OR operation on the results of the two shift operations.

The initial key rotation circuit 224 of the odd round key generator 204 may be a circuit that rotates an input and outputs the result. The input of the initial key rotation circuit 224 may be the input key 130. To rotate the input key 130, the initial key rotation circuit 224 may shift the input key 130 to the left 17 bits, shift the input key 130 to the right 39 bits, and perform a bitwise Boolean OR operation on the results of the two shift operations.

The alternate key rotation circuit 226 of the odd round key generator 204 may be a circuit that rotates an input and outputs the result. The input of the alternate key rotation circuit 226 may be the rotated key 214 generated by the odd round key generator 204. To rotate the rotated key 214, the alternate key rotation circuit 226 may shift the rotated key 214 to the left 34 bits, shift the rotated key 214 to the right 22 bits, and perform a bitwise Boolean OR operation on the results of the two shift operations.

Each of the flip-flops 220 and 230 may be any component that outputs a stored value from a previous clock cycle. For example, the flip-flops 220 and 230 may be D-type flip-flops, latches, or any other component that outputs a stored value from a previous clock cycle. An output of the flip-flop 220 of the even round key generator 202 may be a temporary key 234 (ktmp1). An output of the flip-flop 230 of the odd round key generator 204 may be the rotated key 214 (ktmp2). The output of a respective one of the flip-flops 220 and 230 in a clock cycle may be the same value as the input of the respective flip-flop 220 or 230 in an immediately preceding clock cycle.

Each of the multiplexers 218 and 228 may be any component that selects one of multiple inputs and forwards the selected input as an output. The output of the multiplexer 218 of the even round key generator 202 may be an input to the flip-flop 220 of the even round key generator 202. A first input of the multiplexer 218 may be the input key 130. A second input of the multiplexer 218 may be the output of the standard rotation circuit 216. The output of the multiplexer 228 of the odd round key generator 204 may be an input to the flip-flop 230 of the odd round key generator 204. A first input of the multiplexer 228 may be the output of the initial key rotation circuit 224. A second input of the multiplexer 228 may be the output of the alternate key rotation circuit 226.

A selector of the multiplexer 218 or 228 may receive the end signal 212. The output of the multiplexer 218 of the even round key generator 202 may be the input key 130 in a clock cycle immediately preceding the first of the five clock cycles. For example, the immediately preceding clock cycle may be a fifth clock cycle in a set of five clock cycles during which a previous value of the input data 128 was encrypted. Because the output of the multiplexer 218 is the input of the flip-flop 220, the output of the flip-flop 220 is the input key 130 in the first clock cycle. The output of the flip-flop 220 (the temporary key 234) may be the output of the standard rotation circuit 216 in the remaining four clock cycles.

In contrast, the output of the multiplexer 228 of the odd round key generator 204 may be the output of the initial key rotation circuit 224 in the clock cycle immediately preceding the first of the five clock cycles. Because the output of the multiplexer 228 is the input of the flip-flop 230, the output of the flip-flop 230 may be the output of the initial key rotation circuit 224 in the first clock cycle. The output of the flip-flop 230 (the rotated key 214) may be the output of the alternate key rotation circuit 226 in the remaining four clock cycles.

The first round key generation circuit 222 in the even round key generator 202 generates the first found key 140 from the temporary key 100 and the even round count 208. The second round key generation circuit 232 in the odd round key generator 204 generates the second round key 142 from the rotated key 214 and the odd round count 210. The first round key generation circuit 222 in the even round key generator 202 and the second round key generation circuit 232 in the odd round key generator 204 are described in more detail below in reference to FIG. 3.

Figure 3:
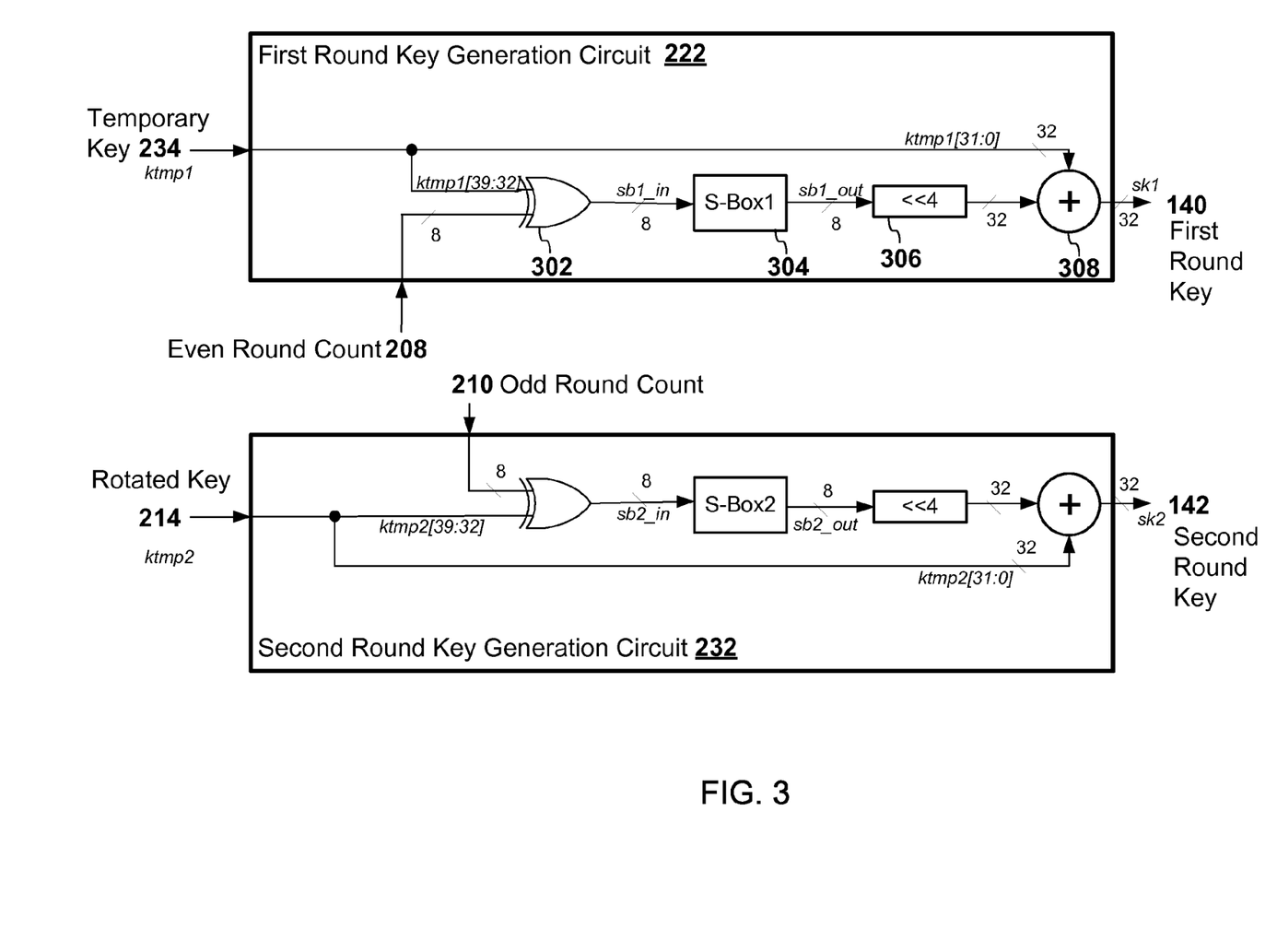
FIG. 3 illustrates the first round key generation circuit and the second round key generation circuit.

FIG. 3 illustrates the first round key generation circuit 222 and the second round key generation circuit 232. The first round key generation circuit 222 may include an exclusive OR gate 302, a substitution-box (S-Box) 304, a shift register 306, and an adder 308. The exclusive OR gate 302 may perform a bitwise Boolean exclusive OR operation on the eight bits of the even round count 208 and bits 32 to 39 of the temporary key 234. The S-Box 304 takes eight input bits and transforms the input bits into eight output bits through a substitution. The input of the S-Box 304 may receive the output of the exclusive OR gate 302. The shift register 306 may shift the output of the S-Box 304 to the left four bits. In an alternative example, the shift register 306 may be replaced by a multiplier that multiplies the output of the S-Box 304 by 16. The adder 308 may add a 32 bit output of the shift register 306 to the right half of the temporary key 234. The result of the addition by the adder 308 may be the first round key 140.

The second round key generation circuit 232 may include the same components as the first round key generation circuit 222, and may operate in the same manner as the first round key generation circuit 222. However, instead of operating on the temporary key 234 and the even round count 208 to generate the first round key 140, the second round key generation circuit 232 may operate on the rotated key 214 and the odd round count 210 to generate the second round key 142.

Figure 4:
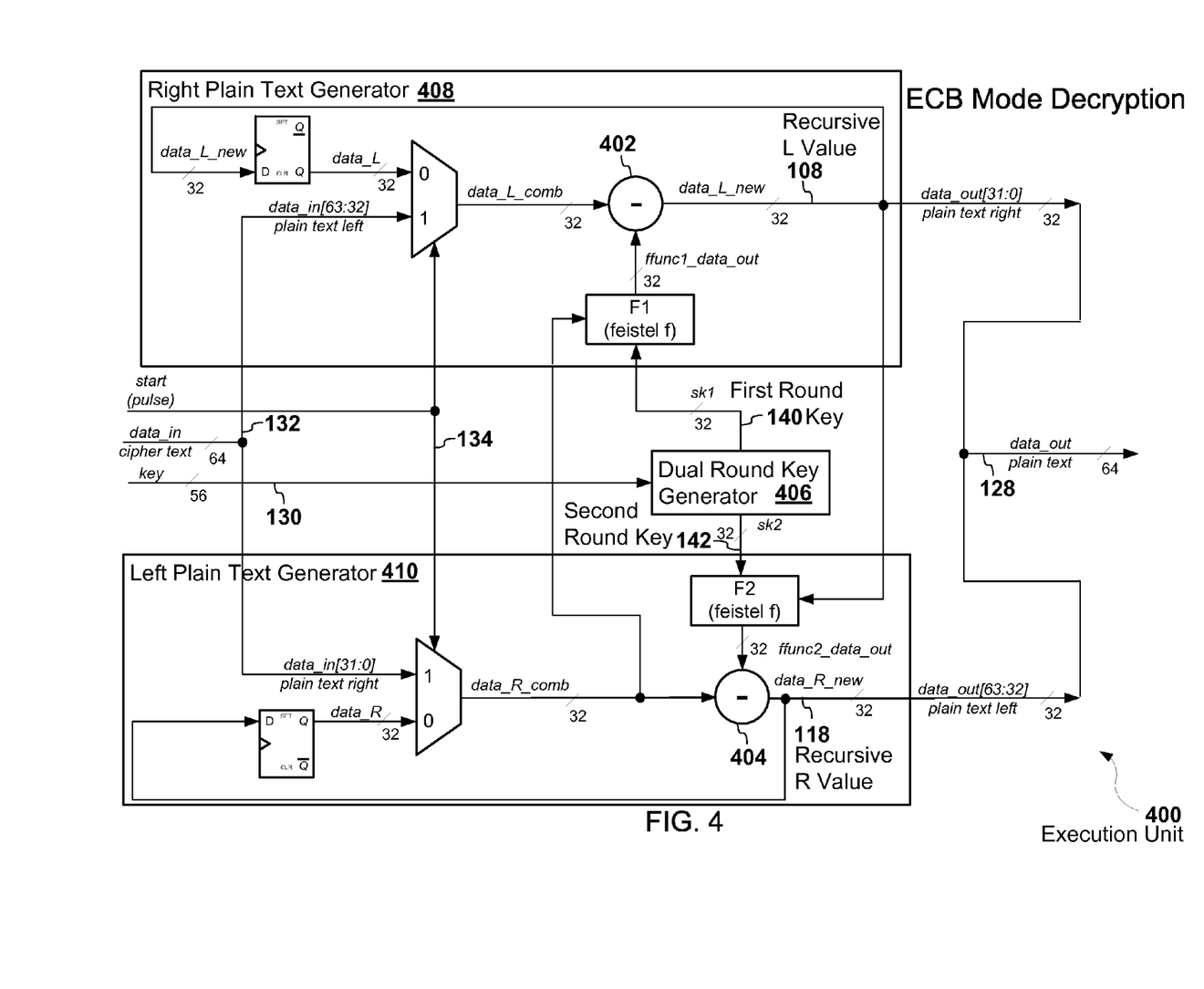
FIG. 4 illustrates an execution unit for decrypting data with the C2 cipher in ECB Mode.

FIG. 4 illustrates an execution unit 400 for decrypting data 128 with the C2 cipher in ECB Mode. As illustrated in FIG. 4, the decryption execution unit 400 may include the same components as the encryption execution unit 100 except that subtracters 402 and 404 replace the adders 116 and 126 of the encryption execution unit 100, and the dual round key generator 406 is implemented differently than the dual round key generator 102 of the encryption execution unit 100. In addition, the right cipher generator 104 and the left cipher generator 106 of the encryption execution unit 100 are renamed right plain text generator 408 and left plain text generator 410, respectively, in the decryption execution unit 400. The renaming is because the data input (data_in) into the right plain text generator 408 and the left plain text generator 410 is the cipher text 132 instead of the plain text data 128, and because the output data (data_out) is the plain text data 128 instead of the cipher text 132.

The operation of the decryption execution unit 400 is like the operation of the encryption execution unit 100, except that the first round key 140 generated by the dual round key generator 406 is for odd rounds, nine through one, and the second round key 142 generated by the dual round key generator 406 is for even rounds, eight through zero. For example, in the first of the five clock cycles, the first round key 140 may be for round nine, and the second round key 142 may be for round eight. In the fifth clock cycle, the first round key 140 may be for round one, and the second round key 142 may be for round zero. Accordingly, in the fifth clock cycle, the plain text 128 may be the combination of the recursive left value 108, which represents the right half of the plain text 128, and the recursive right value 118, which represents the left half of the plain text 128.

Figure 5:
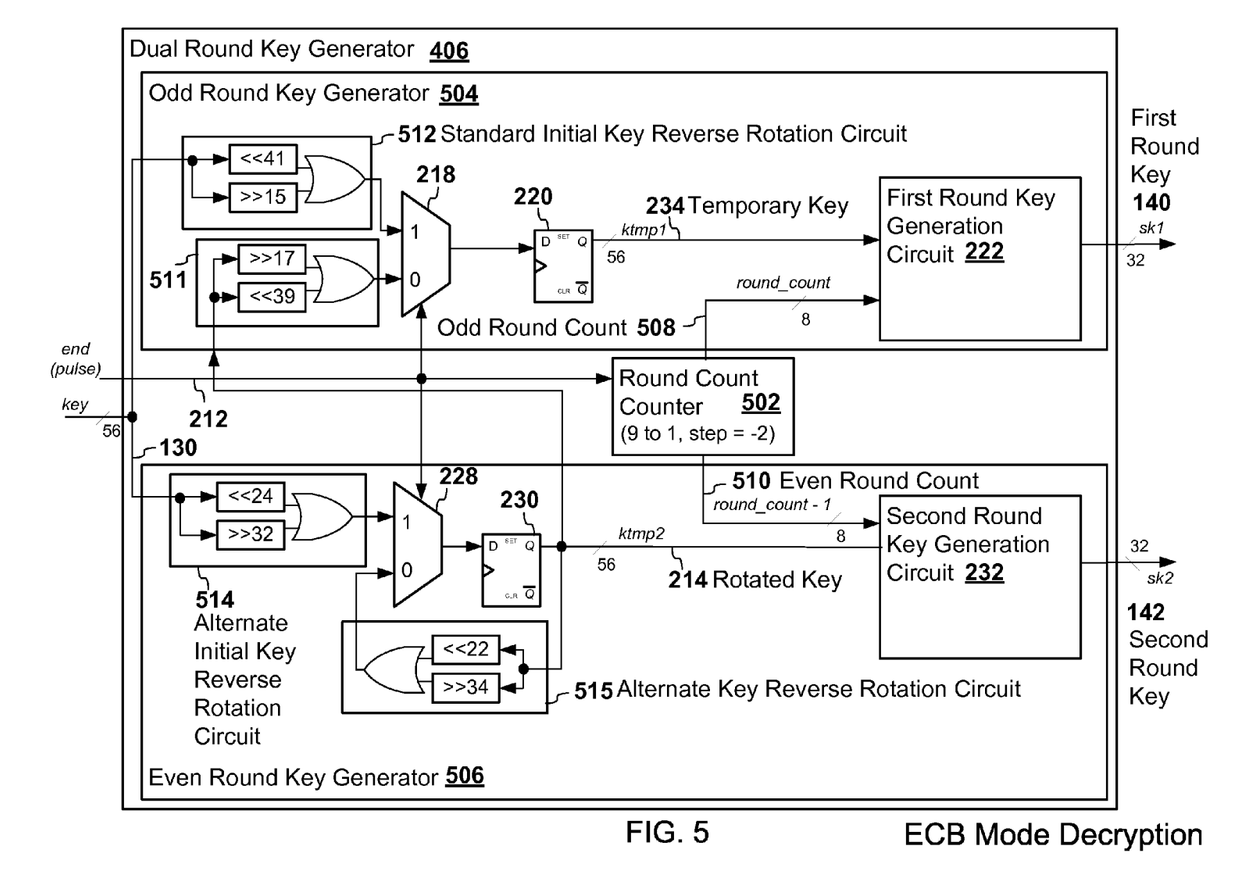
FIG. 5 illustrates the dual round key generator for the C2 cipher in ECB Mode decryption.

FIG. 5 illustrates the dual round key generator 406 for the C2 cipher in ECB Mode decryption. The dual round key generator 406 may include a round count counter 502, an odd round key generator 504, and an even round key generator 506.

The round count counter 502 may be any component that generates an odd round count 508 and an even round count 510, where the odd round count 508 starts at nine and decreases by two until the odd round count 508 reaches one, and the even round count 510 is one less than the odd round count 508. In other words, the even round count 510 is an even value that ranges from eight to zero, and the odd round count 508 is an odd value that ranges from nine to one. Accordingly, the round count counter 502 may generate the even round counts as the even round count 510 and the odd round counts as the even round count 510. In one example, the round count counter 502 may include a counter and an subtracter, where the counter has a step of minus two, the odd round count 508 is the output of the counter, and the even round count 510 is the output of the subtracter that subtracts one from the odd round count 508.

The odd round key generator 504 may be any component that generates the first round key 140, where the first round key 140 is for rounds nine, seven, five, three, and one. The even round key generator 506 may be any component that generates the second round key 142, where the second round key 142 is for rounds eight, six, four, two, and zero.

The change in the end signal 212 may reset the round count counter 502. Alternatively or in addition, the end signal 212 may change state during a reset cycle, which may cause the round count counter 502 to reset.

During operation of the dual round key generator 406, the odd round key generator 504 may operate in parallel with the even round key generator 506. In other words, the odd round key generator 504 may generate the first round key 140 for an even round while the even round key generator 506 generates the second round key 142 for an odd round. The even round key 506 generator may generate the second round key 142 for rounds eight, six, four, two, and zero. In parallel, the odd round key generator 504 may generate the first round key 140 for rounds nine, seven, five, three, and one.

The odd round key generator 504 may receive the odd round count 508 from the round count counter 502. The even round key generator 506 may receive the even round count 510 from the round count counter 502. The odd round key generator 504 and the even round key generator 506 may receive the input key 130 and the end signal 212. In addition, the odd round key generator 504 may receive a rotated key 214 from the even round key generator 506.

The odd round key generator 504 may include a standard reverse rotation circuit 511, a standard initial key reverse rotation circuit 512, a multiplexer 218, a flip-flop 220, and a first round key generation circuit 222. The even round key generator 506 may include an alternate initial key reverse rotation circuit 514, an alternate key reverse rotation circuit 515, a multiplexer 228, a flip-flop 230, and a second round key generation circuit 232.

The standard reverse rotation circuit 511 of the odd round key generator 504 may be a circuit that rotates an input and outputs the result. The input of the standard reverse rotation circuit 511 may be the rotated key 214 generated by the even round key generator 506. To rotate the rotated key 214, the standard reverse rotation circuit 511 may shift the rotated key to the right 17 bits, shift the rotated key 214 to the left 39 bits, and perform a bitwise Boolean OR operation on the results of the two shift operations.

The standard initial key reverse rotation circuit 512 of the odd round key generator 504 may be a circuit that rotates an input and outputs the result. The input of the standard initial key reverse rotation circuit 512 may be the input key 130. To rotate the input key 130, the standard initial key reverse rotation circuit may shift the input key 130 to the left 41 bits, shift the input key 130 to the right 15 bits, and perform a bitwise Boolean OR operation on the results of the two shift operations.

The alternate initial key reverse rotation circuit 514 of the even round key generator 506 may be a circuit that rotates an input and outputs the result. The input of the alternate initial key reverse rotation circuit 514 may be the input key 130. To rotate the input key 130, the alternate initial key reverse rotation circuit 514 may shift the input key 130 to the left 24 bits, shift the input key 130 to the right 32 bits, and perform a bitwise Boolean OR operation on the results of the two shift operations.

The alternate key reverse rotation circuit 515 of the even round key generator 506 may be a circuit that rotates an input and outputs the result. The input of the alternate key reverse rotation circuit may 515 be the rotated key 214 generated by the even round key generator 506. To rotate the rotated key 214, the alternate key reverse rotation circuit 515 may shift the rotated key 214 to the left 22 bits, shift the rotated key 214 to the right 34 bits, and perform a bitwise Boolean OR operation on the results of the two shift operations.

Each of the flip-flops 220 and 230 may be any component that outputs a stored value. For example, the flip-flops 220 and 230 and may be flip-flops. An output of the flip-flop 220 of the odd round key generator 504 may be a temporary key 234 (ktmp1). An output of the flip-flop 230 of the even round key generator 506 may be the rotated key 214 (ktmp2). The output of a respective one of the flip-flops 220 and 230 in a clock cycle may be the same value as the input of the respective flip-flop 220 or 230 in an immediately preceding clock cycle.

Each of the multiplexers 218 and 228 may be any component that selects one of multiple inputs and forwards the selected input as an output. The output of the multiplexer 504 of the odd round key generator 504 may be an input to the flip-flop 220 of the odd round key generator 504. A first input of the multiplexer 218 may be the output of the standard initial key reverse rotation circuit 512. A second input of the multiplexer 218 may be the output of the standard reverse rotation circuit 511. The output of the multiplexer 228 of the even round key generator 506 may be an input to the flip-flop 230 of the even round key generator 506. A first input of the multiplexer 228 may be the output of the alternate initial key reverse rotation circuit 514. A second input of the multiplexer 228 may be the output of the alternate key reverse rotation circuit 515.

A selector of the multiplexer 218 or 230 may receive the end signal 212. The output of the multiplexer 218 of the odd round key generator 504 may be the output of the standard initial key reverse rotation circuit 512 in a clock cycle immediately preceding the first of the five clock cycles. For example, the immediately preceding clock cycle may be a fifth clock cycle in a set of five clock cycles during which a previous value of the input data 128 was decrypted. Because the input of the flip-flop 220 is the output of the multiplexer 218, the output of the flip-flop is the output of the standard initial key reverse rotation circuit 512 in the first clock cycle. The output of the flip-flop 220 (the temporary key 234) may be the output of the standard reverse rotation circuit 511 in the remaining four clock cycles.

In contrast, the output of the multiplexer 228 of the even round key generator 506 may be the output of the alternate initial key reverse rotation circuit 514 in the clock cycle immediately preceding the first of the five clock cycles. Because the input of the flip-flop is the output of the multiplexer 228, the output of the flip-flop 230 may be the output of the alternate initial key reverse rotation circuit 514 in the first clock cycle. The output of the flip-flop 230 (the rotated key 214) may be the output of the alternate key reverse rotation circuit 515 in the remaining four clock cycles.

The first round key generation circuit 222 in the odd round key generator 222 generates the first found key 140 from the temporary key 234 and the odd round count 508. The second round key generation circuit 232 in the even round key generator 506 generates the second round key 142 from the rotated key 214 and the even round count 510. The first round key generation circuit 222 in the even round key generator and the second round key generation circuit 232 in the odd round key generator are described in more detail above in reference to FIG. 3.

Figure 6:
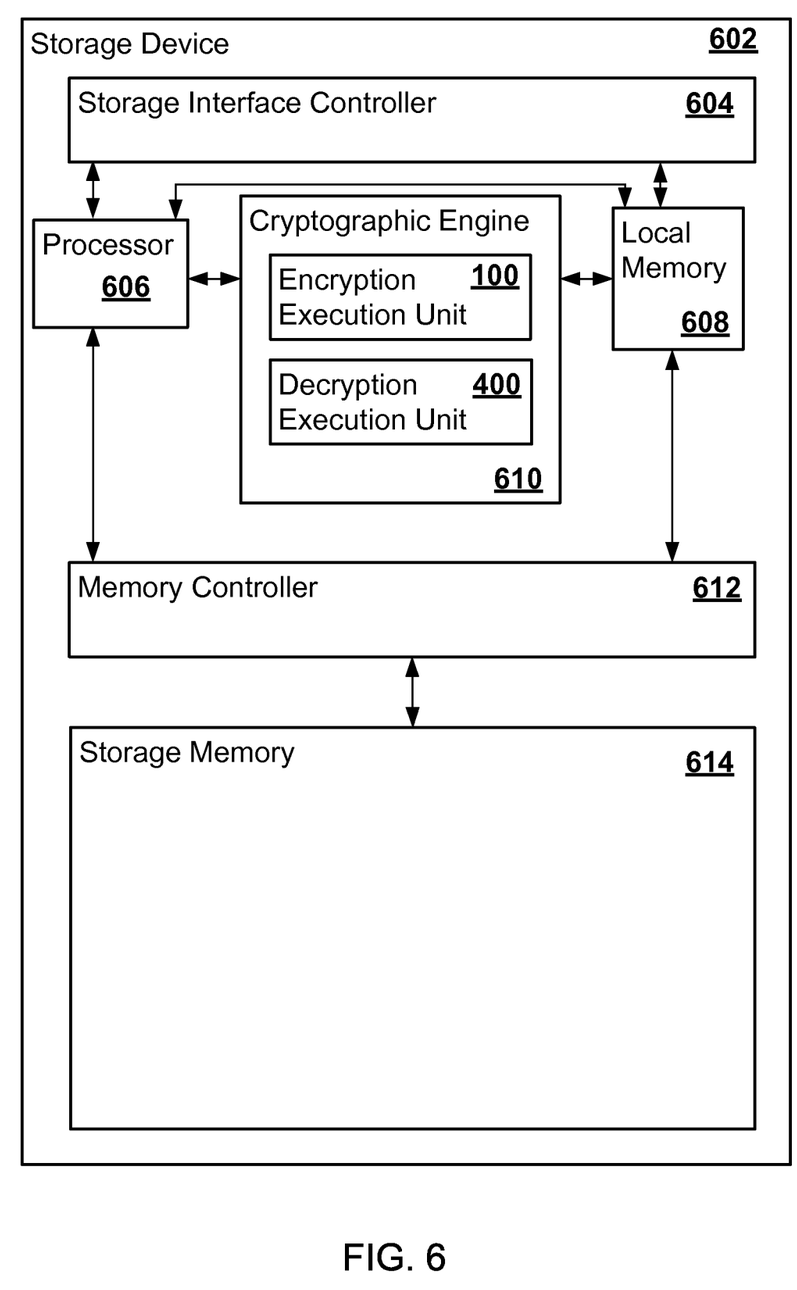
FIG. 6 illustrates a storage device that encrypts and decrypts data based on the C2 cipher.

FIG. 6 illustrates a storage device 602 that encrypts and decrypts data based on the C2 cipher. The storage device 602 may include a storage interface controller 604, a processor 606, local memory 608, a cryptographic engine 610, a memory controller 612, and storage memory 614.

The storage interface controller 604 may be hardware or a combination of hardware and software, for communication data between the storage device 602 and a host device, such as a laptop, a mobile device, or any other computing device. Examples of the storage interface controller 604 may include a MMC (Multi-Media Card) interconnect, a SD (Secure Digital) interconnect, a SCSI (Small Computer System Interface) interconnect, a SATA (serial AT attachment) interconnect, or a PCIE (Peripheral Component Interconnect Express) interconnect (PCIE is a registered trademark of PCI-SIG of Portland, Oreg.).

The processor 606 may be a general processor, a central processing unit, an application specific integrated circuit (ASIC), a digital signal processor, a field programmable gate array (FPGA), a digital circuit, an analog circuit, or any combination thereof. The processor 606 may be one or more devices operable to execute computer executable instructions or computer code embodied in the local memory 608 or in other memory.

The local memory 608 may be any device for storing and retrieving data or any combination thereof. The local memory 608 may include non-volatile and/or volatile memory, such as a random access memory (RAM), a read-only memory (ROM), an erasable programmable read-only memory (EPROM), and/or flash memory. Alternatively or in addition, the local memory 608 may include an optical, magnetic (hard-drive) and/or any other form of memory.

The cryptographic engine 610 may include the encryption execution unit 100 and the decryption execution unit 400. The memory controller 612 may be any component that translates memory addresses specified by the processor 606 into the appropriate electrical signaling to access corresponding locations in the storage memory 614. An example of the memory controller 612 may include flash memory controller.

The storage memory 614 may be any device for storing and retrieving data or any combination thereof. The storage memory 614 may include non-volatile and/or volatile memory, such as a random access memory (RAM), a read-only memory (ROM), an erasable programmable read-only memory (EPROM), or flash memory. Alternatively or in addition, the storage memory 614 may include an optical, magnetic (hard-drive) or any other form of memory.

During operation of the storage device 602, the storage interface controller 604 may process read and/or write requests directed to the storage device 602 by a host device. The storage device 602 may notify the processor 606 that data is to be read and/or written.

If the storage interface controller 604 receives a write request, then the processor 606 and/or the storage interface controller 604 may store the unencrypted data received by the storage interface controller 604 in the local memory 608. The processor 606 may direct the encryption execution unit 100 to read the unencrypted data (input data 128) from the local memory 608 and generate the encrypted data (the cipher text 132) as describe herein. The encryption execution unit 100 may store the encrypted data in the local memory 608. The processor 606 may direct the memory controller 612 to copy the encrypted data from the local memory 608 to the storage memory.

If the storage interface controller 605 receives a read request, then the storage interface controller 604 may notify the processor 606 that the read request was received. The processor 606 may direct the memory controller 612 to read the encrypted data from the storage memory 614. The memory controller 612 may copy the encrypted data from the storage memory 614 to the local memory 608. The processor 606 may direct the decryption execution unit 404 to read the encrypted data from the local memory 608 and generate the plain text data. The processor 606 and/or the decryption execution unit 404 may write the plain text data to the local memory 608. The processor may direct the storage interface controller 604 to read the plain text data from the local memory 608, and respond to the read request by transmitting the plain text data to the host device.

Because the cryptographic engine 610 may comprise the encryption execution unit 100, the cryptographic engine 610 may include components thereof, such as the right cipher generator 104, and the left cipher generator 106, and the dual round key generator 102, which comprises the even round key generator 202 and the odd round key generator 204. In addition, because the cryptographic engine 610 may comprise the decryption execution unit 400, the cryptographic engine 610 may include components thereof, such as the dual round key generator 406, which comprises the odd round key generator 504 and the even round key generator 506.

The systems described herein, such as the execution units 100 and 400, the dual round key generators 102 and 406, the round key generation circuits 222 and 232, and the storage device 602, may be implemented in many different ways. For example, the systems may be implemented as a digital circuit, an analog circuit, an application specific integrated circuits (ASIC), a field programmable gate array (FPGA), a digital circuit, an analog circuit, or any combination thereof. Although some features are shown implemented in hardware, some parts of the systems may be implemented as computer-executable instructions or as data structures in a memory executable by a processor, such as by the processor 606 in the storage device 602. For example, the round count counter 206 and 502 may be implemented in firmware.

The systems and/or the components may be implemented with additional, different, or fewer entities. In a first example, the encryption execution unit 100 may include a clock that generates a clock signal that drives components such as the flip-flops 220 and 230. In a second example, the dual round key generator 406 of the decryption execution unit 400 may comprise a counter and an adder, where the counter is an even number in a range from eight to zero, and the adder adds one to the counter. In a third example, the storage device 602 may include the decryption execution unit 400 but not the encryption execution unit 100. Instead, the features of the encryption execution unit 100 may be implemented in software.

As yet another example, the storage device 602 may not include the storage interface controller 604. Instead, the processor 606 may provide the read and write commands to the cryptographic engine 610 by executing instructions. Alternatively or in addition, the storage device may not include the memory controller 612 and both the local memory 608 and the storage memory 614. Instead, the local memory 608 may serve as the storage memory 614 and the processor 606 may access the local memory 608.

In some examples, the components of the encryption execution unit 100 may be separate and distinct from the components of decryption execution unit 400. In other examples, a subset of the components of the encryption execution unit 100 and the decryption execution unit 400 may be shared. For example, components with common features, such as the round key generation circuits 222 and 232, may be shared and time multiplexed to avoid potential conflicting use of the shared components.

The rounds are described as varying from zero to nine. However, the rounds may alternatively be described as varying from one to ten.

The number of rounds in the C2 cipher may be different than ten in future versions of the C2 Block Cipher Specification. Alternatively or in addition, the size of data elements, such as the input data 128, the input key 56, and/or the cipher text 64, may be different in future versions of the C2 Block Cipher Specification. The example components described herein may be easily modified to accommodate such changes.

Two rounds may be processed per clock cycle. Alternatively, two rounds may be processed in more than one clock cycle.

Examples that implement encryption and/or decryption in Electronic Codebook (ECB) Mode may be modified to implement encryption and/or decryption in Converted Cipher Block Chaining (C-CBC) Mode. According to the C2 Block Cipher Specification, when performing encryption in C-CBC Mode, all ten round keys for the first plain text data may be generated from the input key 130 as in ECB Mode. A new input key (inkey) may be generated as a bitwise exclusive OR between the input key 130 and the cipher text 132 (the recursive left value 108 combined with the recursive right value 118) at round four. The new input key (instead of the original input key 130) may be used in rounds zero and one (truncated key schedule) in the encryption of subsequent plain text data blocks, starting with the second data block in a group of data blocks being encrypted. In addition, according to the C2 Block Cipher Specification, after the first data block of 64 bits is encrypted, subsequent data blocks are encrypted using a truncated key schedule, which means that only the round keys for rounds zero and one are generated and used. Therefore, the examples are easily modified to account for the differences between the C-CBC Mode and the ECB Mode.

Figure 7:
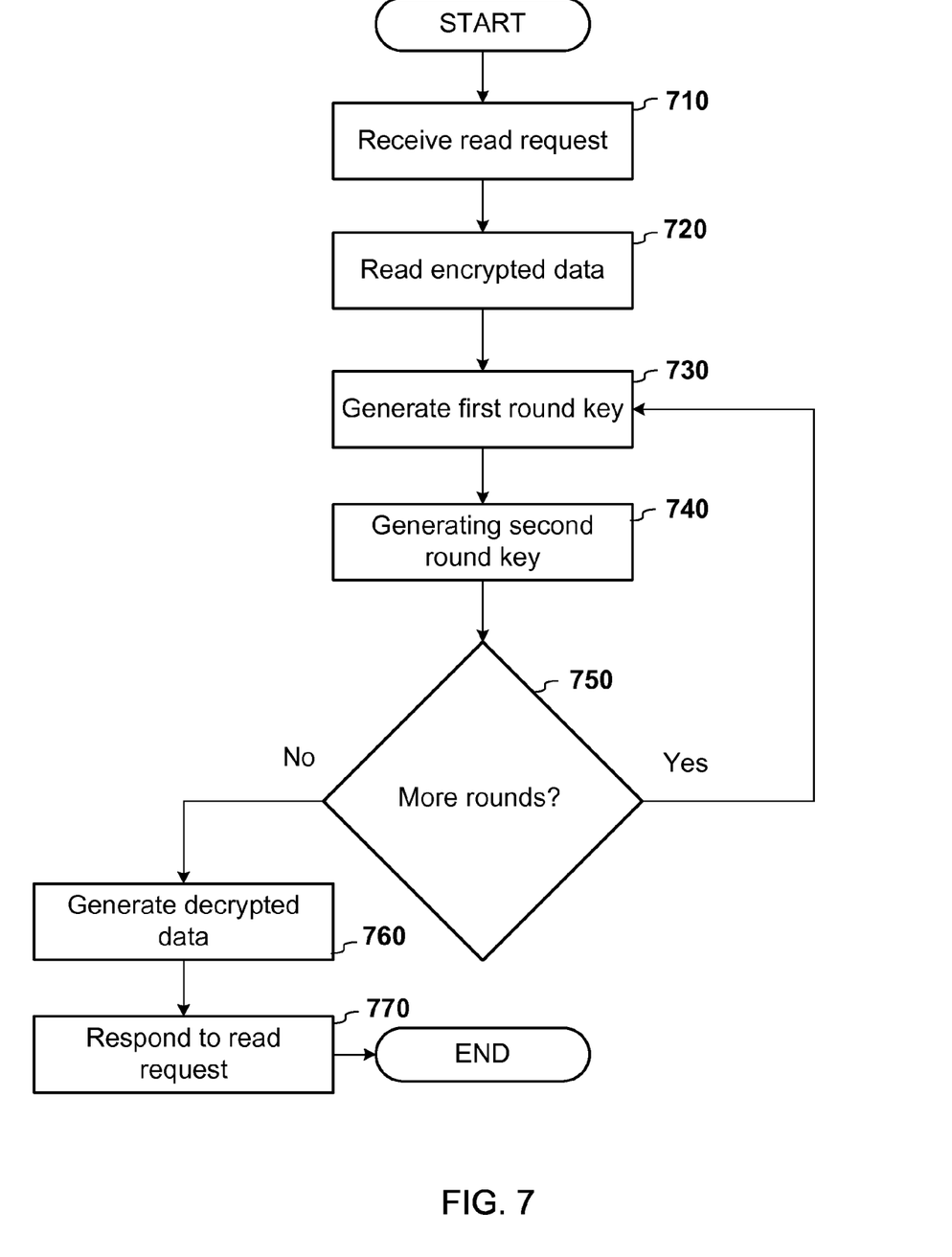
FIG. 7 illustrates an example flow diagram of the logic of the storage device.

FIG. 7 illustrates an example flow diagram of the logic of the storage device 602. The logic may include additional, different, or fewer operations. The operations may be executed in a different order than illustrated in FIG. 7.

The operations may begin with a receipt (710) of a read request at the storage interface controller 604 included in the storage device 602. Encrypted data may be read (720) from the storage memory 614 included in the storage device (602) in response to the read request.

The first round key 140 may be generated (730) with the standard initial key reverse rotation circuit 512 if the round count is a predetermined round (such as round zero) or with the standard key reverse rotation circuit 512 if the round count is not the predetermined round. The second round key 142 may be generated (740) in parallel with the first round key 140 using the alternate initial key reverse rotation circuit 514 if the round count is the predetermined round or using the alternate key reverse rotation circuit 515 if the round count is not the predetermined round.

If more rounds are remaining (750), then the operations may return to the generation (730) and (740) of the first and second round keys 142. Alternatively, if no rounds remain (for example, round keys for rounds nine to zero were generated), then operations may proceed to the generation (760) of the decrypted data.

Operations may end by, for example, responding (770) to the read request by transmitting the decrypted data from the storage interface controller 604.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable storage media, for example, secondary storage devices such as hard disks, floppy disks, and CD-ROMs; or other forms of ROM or RAM either currently known or later developed. The computer-readable storage media may be non-transitory computer-readable media, which includes CD-ROMs, volatile or non-volatile memory such as ROM and RAM, or any other suitable storage device. Moreover, the various modules and screen display functionality is but one example of such functionality and any other configurations encompassing similar functionality are possible.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A storage device that encrypts data based on a Cryptomeria (C2) cipher, the storage device comprising:
   a cryptographic engine configured to generate encrypted data based on the C2 cipher from data received by the storage device; and
   a storage memory configured to store the encrypted data, wherein the cryptographic engine comprises an even round key generator that generates a first round key on even rounds and an odd round key generator that generates a second round key on odd rounds, wherein the odd round key generator comprises an initial key rotation circuit and an alternate key rotation circuit, wherein the odd round key generator generates the second round key from a rotated key, wherein the rotated key is generated by the initial key rotation circuit on a predetermined round and by the alternate key rotation circuit on rounds other than the predetermined round, and wherein the cryptographic engine generates the encrypted data from the first round key and the second round key, wherein the even round key generator and the odd round key generator operate in parallel.

2. The storage device of claim 1, wherein the alternate key rotation circuit generates the rotated key as a bitwise Boolean OR operation on an input value shifted left 34 bits and the input value shifted right 22 bits, wherein the input value on rounds three, five, seven, and, nine is the rotated key of rounds one, three, five, and seven, respectively.

3. The storage device of claim 1, wherein the even round key generator generates the first round key from an input key on round zero and from the rotated key received from the odd round key generator on rounds two, four, six, and eight, wherein the rotated key received by the even round key generator on rounds two, four, six, and eight is the rotated key generated by the odd round key generator on rounds one, three, five, and seven, respectively.

4. The storage device of claim 3, wherein a right cipher generator of the cryptographic engine generates a recursive left value on rounds two, four, six, and eight from a recursive right value from rounds one, three, five, and seven, respectively, and wherein a left cipher generator of the cryptographic engine generates the recursive right value on rounds one, three, five, seven, and nine from the recursive left value of rounds zero, two, four, six, and eight, respectively.

5. The storage device of claim 1 further comprising a memory controller, wherein the memory controller is configured to read the encrypted data from the storage memory, the cryptographic engine is configured to decrypt the encrypted data into the data, wherein the encrypted data is decrypted in response to a read request.

6. A method of decrypting data on a storage device based on a Cryptomeria (C2) cipher, the method comprising:
   receiving a read request;
   reading encrypted data from a storage memory included in the storage device in response to the read request;
   decrypting the encrypted data with a decryption execution unit in the storage device based on the C2 cipher by generating a first round key and a second round key in parallel, wherein generating the first and second round keys in parallel comprises:
      generating the first round key with a standard initial key reverse rotation circuit if a round count is a predetermined round or with a standard key reverse rotation circuit if the round count is not the predetermined round, and
      generating the second round key with an alternate initial key reverse rotation circuit if the round count is the predetermined round or with an alternate key reverse rotation circuit if the round count is not the predetermined round, wherein the decryption execution unit generates decrypted data from the first and second round keys and from the encrypted data; and
   responding to the read request by transmitting the decrypted data.

7. The method of claim 6, wherein the predetermined round is round zero.

8. The method of claim 6, wherein generating the second round key with the alternate initial key reverse rotation circuit comprises:
   generating a first value by shifting an input key left 24 bits with the alternate initial key reverse rotation circuit;
   generating a second value by shifting the input key right 32 bits with the alternate initial key reverse rotation circuit;
   generating a rotated key with the alternate initial key reverse rotation circuit as a result of a Boolean OR operation between the first value and the second value; and
   generating the second round key from the rotated key.

9. The method of claim 6, wherein generating the second round key with the alternate key reverse rotation circuit comprises:
   generating a first value by shifting a first rotated key left 22 bits with the alternate key reverse rotation circuit;
   generating a second value by shifting the first rotated key right 34 bits with the alternate key reverse rotation circuit;
   generating a second rotated key with the alternate key reverse rotation circuit as a result of a Boolean OR operation between the first value and the second value; and
   generating the second round key from the second rotated key.

10. The method of claim 6, wherein transmitting the decrypted data comprises transmitting the decrypted data to a host device from a storage interface controller in the storage device.

11. The method of claim 6, wherein generating the first and second round keys comprises generating the first round key for odd rounds and generating the second round key for even rounds.

12. A system for encrypting input data with a Cryptomeria (C2) cipher, the system comprising:
   a right cipher generator circuit configured to generate a right half of a cipher text from a first round key and the input data based on the C2 cipher;
   a left cipher generator circuit configured to generate a left half of the cipher text from a second round key and input data based on the C2 cipher;
   an even round key generator circuit configured to generate the first round key on even rounds; and
   an odd round key generator circuit configured to generate the second round key on odd rounds, wherein the even round key generator circuit and the odd round key generator circuit are configured to generate the first and second round keys together in a single clock cycle, wherein the odd round key generator circuit comprises an initial key rotation circuit and an alternate key rotation circuit, wherein the odd round key generator circuit is configured to generate the second round key from a rotated key, wherein the initial key rotation circuit is configured to generate the rotated key on a predetermined round, and the alternate key rotation circuit is configured to generate the rotated key on rounds other than the predetermined round.

13. The system of claim 12, wherein the left cipher generator circuit is configured to generate a right data combination as a right half of the input data in a first clock cycle of five clock cycles and as an output of a flip-flop in clock cycles two through five of the five clock cycles, wherein the output of the flip-flop in each of the four through five clock cycles is a recursive right value from a respective previous clock cycle in the five clock cycles, and wherein the recursive right value in the last of the five clock cycles is the left half of the cipher text.

14. The system of claim 13, wherein the right cipher generator circuit is configured to generate the right half of the cipher text from the right data combination, the first round key, and the input data.

15. The system of claim 13, wherein the right cipher generator circuit is configured to generate the right half of the cipher text as a sum of a left data combination and an output of a Feistel function, wherein the output of the Feistel function is generated from the first round key and the right data combination.

* * * * *